US012686453B2

(12) United States Patent
Webb

(10) Patent No.: US 12,686,453 B2
(45) Date of Patent: Jul. 21, 2026

(54) SYSTEM TO FIELD INSTALL SOLAR RACKING COMPONENTS AND TORQUE BEAMS AND METHODS OF USE

(71) Applicant: Lance Webb, Brownfield, TX (US)

(72) Inventor: Lance Webb, Brownfield, TX (US)

( * ) Notice: Subject to any disclaimer, the term of this patent is extended or adjusted under 35 U.S.C. 154(b) by 357 days.

(21) Appl. No.: 18/167,255

(22) Filed: Feb. 10, 2023

(65) Prior Publication Data

US 2023/0257041 A1 Aug. 17, 2023

Related U.S. Application Data

(60) Provisional application No. 63/328,505, filed on Apr. 7, 2022, provisional application No. 63/309,110, filed on Feb. 11, 2022.

(51) Int. Cl.
| | |
|---|---|
| *B62D 63/06* | (2006.01) |
| *B60G 9/02* | (2006.01) |
| *B62D 21/20* | (2006.01) |
| *B65G 67/24* | (2006.01) |

(52) U.S. Cl.
CPC ............. *B62D 63/061* (2013.01); *B60G 9/02* (2013.01); *B62D 21/20* (2013.01); *B65G 67/24* (2013.01); *B65G 2201/0217* (2013.01)

(58) Field of Classification Search
CPC ........ B62D 63/061; B62D 21/20; B60G 9/02; B65G 67/24; B65G 2201/0217
See application file for complete search history.

(56) References Cited

U.S. PATENT DOCUMENTS

| | | | | |
|---|---|---|---|---|
| 1,567,473 | A | * 12/1925 | Starr | ...................... B65G 67/00 |
| | | | | 414/395 |
| 2,279,340 | A | * 4/1942 | Postlewaite | ............. B05C 13/02 |
| | | | | 104/32.1 |
| 2,408,862 | A | * 10/1946 | Lisota | ................... B60P 1/6454 |
| | | | | 414/491 |

(Continued)

FOREIGN PATENT DOCUMENTS

| | | | | |
|---|---|---|---|---|
| AU | 200245907 | A | * 12/2002 | |
| AU | 785409 | B2 | * 5/2007 | |
| WO | WO-2010082842 | A1 | * 7/2010 | ............... B60D 1/01 |

OTHER PUBLICATIONS

International Search Authority, "International Search Report," PCT/US23/62379, mailed Jun. 16, 2023.

(Continued)

*Primary Examiner* — Jacob B Meyer
(74) *Attorney, Agent, or Firm* — Mathew L. Grell, Esq.; Grell & Watson Patent Attorneys LLC

(57) ABSTRACT

A system to field install solar racking components and torque beams includes a trailer base with structural supports, having independent left and right cantilever axles and a wheel configured to level said base on a horizontal axis a first vertical lift system connected to said base and pivotably connected to a cross brace and a table top rail configured to raise and lower a set of torque beam above beam post to traverse field, and a second vertical lift system connected to said base and connected to said cross brace and top rails position at one end of said cross brace and said table top rail to extract torque beam from said cross brace and a said table top rail to position torque beams relative to beam post.

22 Claims, 10 Drawing Sheets

(56)  References Cited

U.S. PATENT DOCUMENTS

| | | | | |
|---|---|---|---|---|
| 2,680,529 A * | 6/1954 | Narvestad | ............. | B60P 1/4407 414/558 |
| 2,710,104 A * | 6/1955 | Putnam | ..................... | F27B 9/38 198/463.6 |
| 2,776,762 A * | 1/1957 | Schmidgall | .......... | B60P 1/4407 414/548 |
| 3,042,231 A * | 7/1962 | Cyphert | ................ | B60P 1/4407 414/548 |
| 3,219,206 A * | 11/1965 | Cocker, III | ............. | D02H 3/00 242/561 |
| 3,419,159 A * | 12/1968 | Schaller | ................ | B23Q 7/001 414/746.3 |
| 3,486,609 A * | 12/1969 | Rogers | .................. | B65G 25/02 198/772 |
| 3,667,620 A * | 6/1972 | Steiro | .................. | B60P 1/6472 414/746.4 |
| 3,858,731 A * | 1/1975 | Briggs | .................. | F16L 1/0243 414/745.9 |
| 4,289,443 A * | 9/1981 | Jacob | ................. | B65G 47/8884 221/299 |
| 5,358,371 A * | 10/1994 | Neddo | ................... | F16L 1/065 198/532 |
| 8,500,383 B2 * | 8/2013 | Schmidgall | .............. | B60P 7/12 414/509 |
| 10,720,541 B2 | 7/2020 | Gerwing et al. | | |
| 2012/0034056 A1 * | 2/2012 | Schmidgall | .............. | B60P 7/12 74/471 R |
| 2023/0257041 A1 * | 8/2023 | Webb | ..................... | B60G 5/00 280/656 |

OTHER PUBLICATIONS

International Search Authority, "Written Opinion," PCT/US23/62379, mailed Jun. 16, 2023.

* cited by examiner

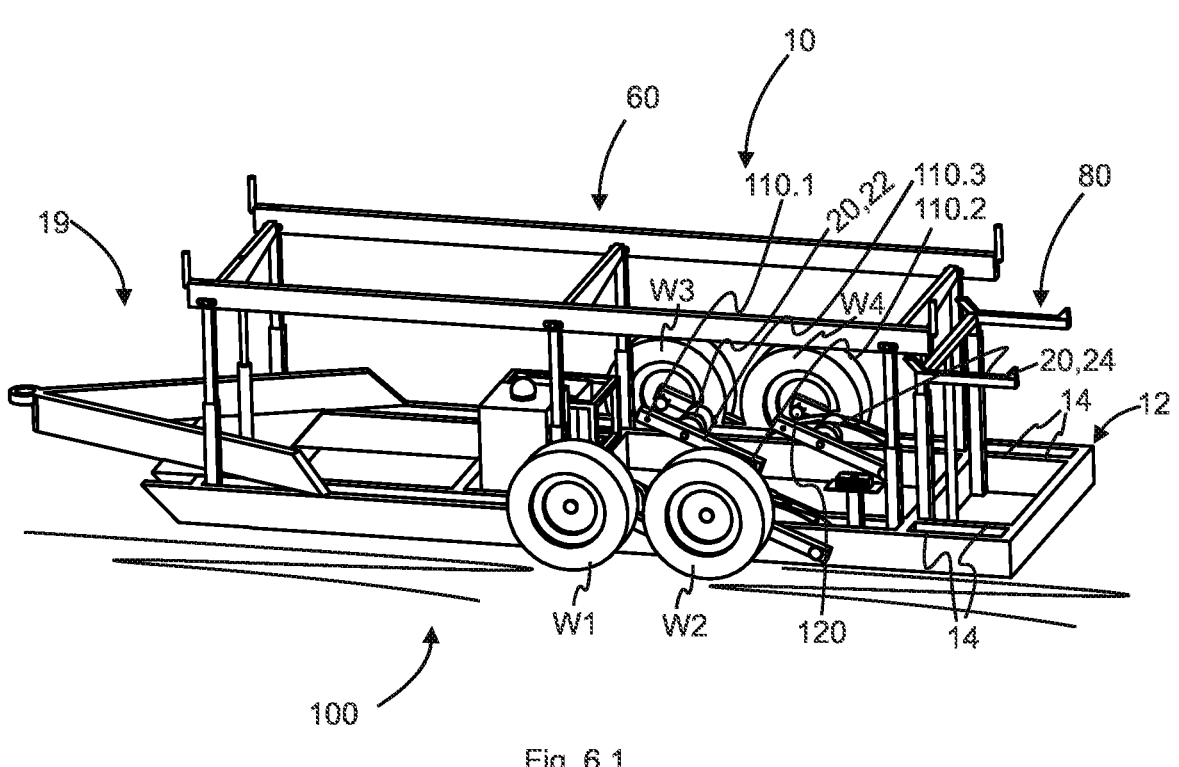
Fig. 6.1

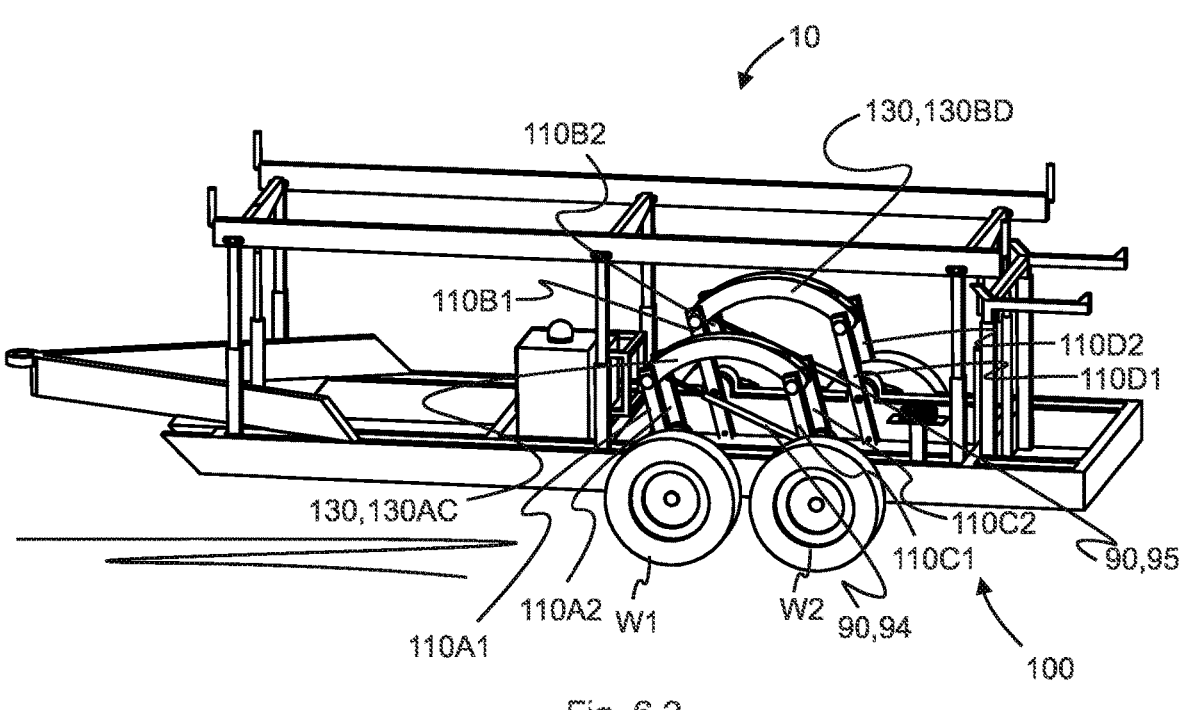
Fig. 6.2
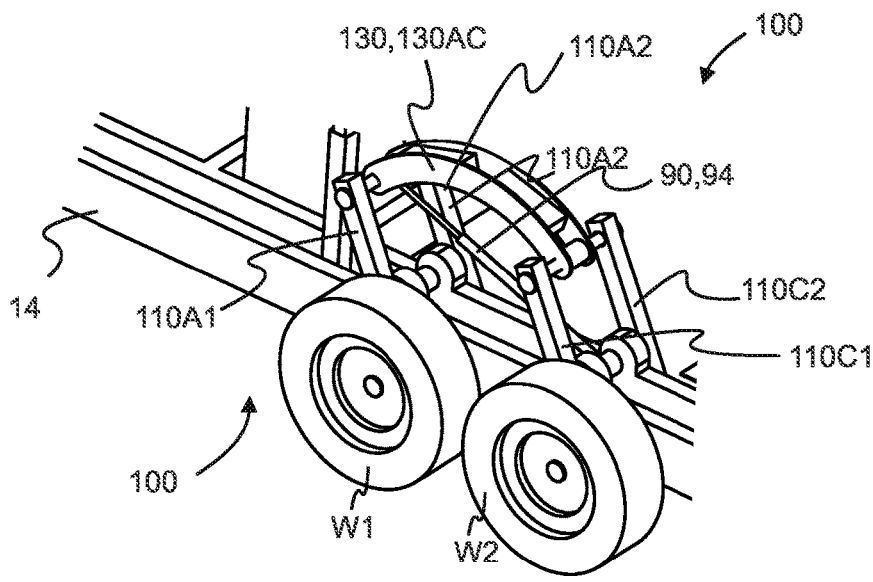
Fig. 6.3

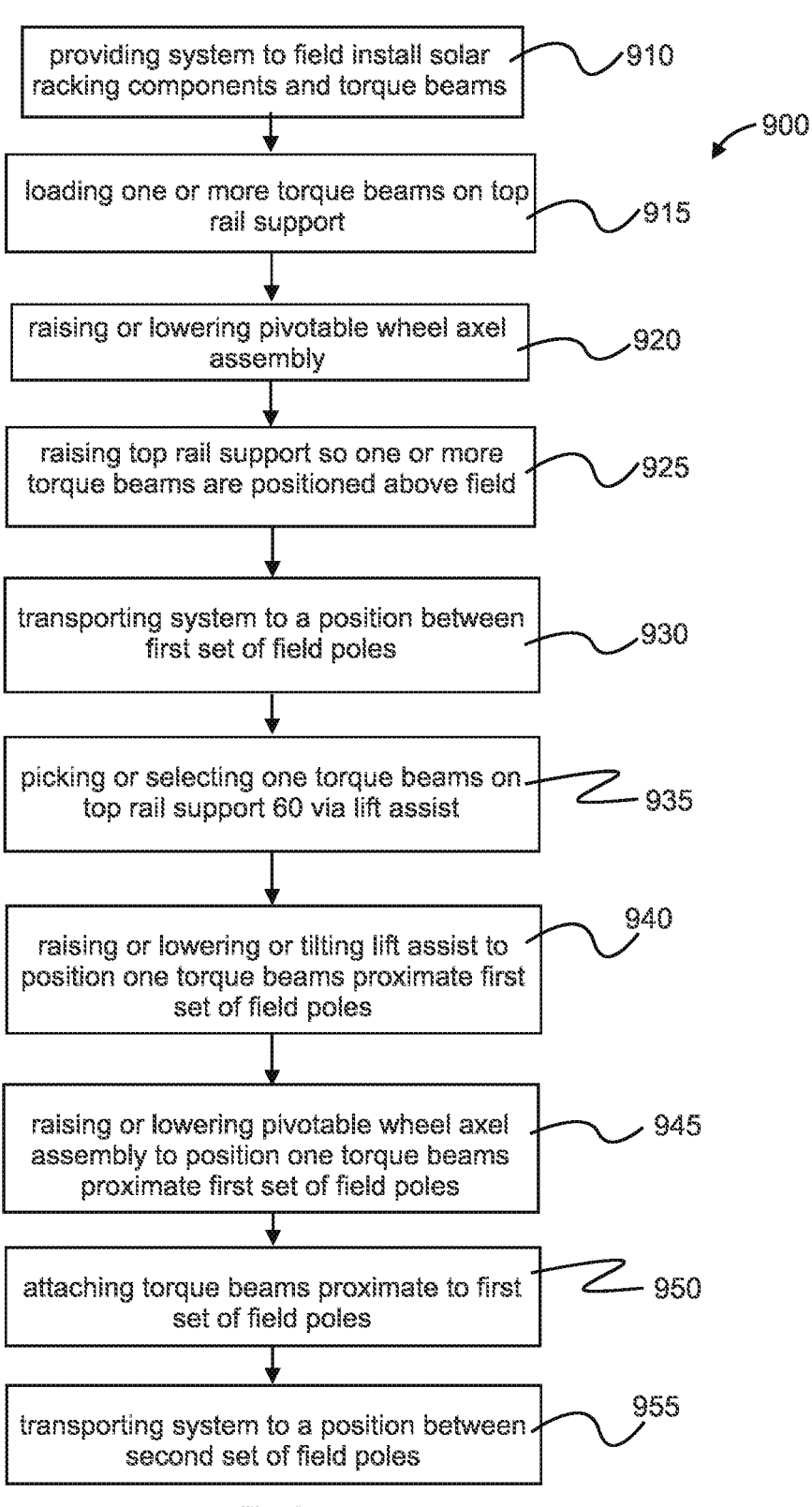

providing system to field install solar racking components and torque beams ⌇910

900 loading one or more torque beams on top rail support ⌇915 raising or lowering pivotable wheel axel assembly ⌇920 raising top rail support so one or more torque beams are positioned above field ⌇925 transporting system to a position between first set of field poles ⌇930 picking or selecting one torque beams on top rail support 60 via lift assist ⌇935 raising or lowering or tilting lift assist to position one torque beams proximate first set of field poles ⌇940 raising or lowering pivotable wheel axel assembly to position one torque beams proximate first set of field poles ⌇945 attaching torque beams proximate to first set of field poles ⌇950 transporting system to a position between second set of field poles ⌇955

Fig. 9

SYSTEM TO FIELD INSTALL SOLAR RACKING COMPONENTS AND TORQUE BEAMS AND METHODS OF USE

CROSS-REFERENCE TO RELATED APPLICATIONS

To the full extent permitted by law, the present United States Non-Provisional patent application hereby claims priority to and the full benefit of, U.S. Provisional Application No. 63/309,110, filed on Feb. 11, 2022, entitled "System to Field Install Solar Racking Components and Torque Beams", and U.S. Provisional Application No. 63/328,505, filed on Apr. 7, 2022, entitled "System to Field Install Solar Racking Components and Torque Beams", which is incorporated by reference herein in its entirety.

FIELD OF THE DISCLOSURE

The present disclosure is directed to vehicle trailers and skid loaders and, more specifically, height adjustable vehicle trailers and skid loaders to transport elongated components and beams.

BACKGROUND

In general, a trailer is an unpowered vehicle towed behind a powered vehicle and a skid loader is a wheeled or tracked vehicle typically with a front in loader to haul items. They are commonly used for the transport and repositioning of goods and materials. Trailers may be configured with one or a plurality stationary carrying rigs, such as to haul and transport construction equipment and materials for a given project to the worksite.

One disadvantage to a previous approach of the vehicle trailers is the stacking or carrying rig are hard to position, it is difficult to separate individual items, such as stacks or bundles of elongated members, and position them at different angles and heights for immediate field assembly and movement to the next field assembly and repeat.

Another disadvantage to a previous approach of the skid loader with frontend loader or other front loader is that the loader can only carry a few items, such as such as stacks or bundles of elongated members and it is difficult to separate individual items, such as from stacks or bundles of elongated members, and position them at different angles for immediate field assembly and movement to the next field assembly and repeat.

Multiple passes over the field by vehicles create wheel ruts in mud conditions requiring post micro-grading at the end of the installation driving up the cost of installation.

Therefore, it is readily apparent that there is a recognizable unmet need for a system to field install solar racking components and torque beams and methods of use that may be configured to address at least some aspects of the problems discussed above common to trailers and frontend loaders.

SUMMARY

Briefly described, in an example embodiment, the present disclosure may overcome the above-mentioned disadvantages and may meet the recognized need for a system to field install solar racking components and torque beams includes a trailer base with structural supports, having independent left and right cantilever axles affixed to opposite sides of said structural support and a wheel affixed to said cantilever axle said left and right cantilever axles pivotably connected to trailer (base) configured to level said base on a horizontal axis via independent movement of said left and right cantilever axles and to raise and lower on a vertical axis said trailer (base), a first vertical lift assist system connected to said base and pivotably connected to a cross brace and a table top rail configured to raise and lower said cross brace and said table top rail on a vertical axis relative to said trailer (base) to raise a set of torque beam above beam post to traverse field, and a second vertical lift assist system connected to said base and connected to said cross brace and top rails position at one end of said cross brace and said table top rail to extract torque beam from said cross brace and a said table top rail to position torque beams relative to beam post, and thus to eliminate pre-staging crew pass to place racking components on post beams and combine placement of racking components and torque beams in one pass while minimizing surface tire ruts during mud conditions.

Accordingly, in one aspect, the present disclosure may enable elimination pre-staging crew pass to place racking components on post beams, such pre-staging equipment and tools can be placed in compartments or bins of this solar racking components and torque beams transport system.

Accordingly, in another aspect, the present disclosure may combine placement of racking components and torque beams in one pass.

Accordingly, in another aspect, the present disclosure may enable a single pass across the field while minimizing surface tire ruts during mud conditions.

Accordingly, in another aspect, the present disclosure includes the ability to provide a vertically adjustable trailer that enables an operator to lower the deck to the ground and operate as a skid.

In an exemplary embodiment of a system to field install solar racking components and torque beams includes a trailer base with structural supports, having a first pair of left and right cantilever axles affixed to opposite sides of the structural support and a wheel affixed to each of the left and right cantilever axles, each of the left and right cantilever axles pivotably configured to level the trailer base on a horizontal axis via independent movement of the left and right cantilever axles and to raise, lower, and tilt the trailer base on a vertical axis of the trailer base, a first vertical lift system slidably connected to the trailer base, the first vertical lift system having at least two tabletop rails running lengthwise in parallel with the trailer base and connected crosswise by at least two cross braces, the at least two tabletop rails and the at least two cross braces configured to raise and lower on a vertical axis the torque beams relative to the trailer base to raise the torque beams above the post; and a second vertical lift system slidably connected to a rear of the trailer base, the second vertical lift system having at least two lift assist rails running lengthwise in parallel with the trailer base and connected crosswise by a cross brace, the at least two lift assist rails and the cross brace configured to raise and lower on a vertical axis relative to the trailer base to extract the torque beam from the torque beams positioned on the first vertical lift system to align the torque beam the post.

In an exemplary embodiment of a system to field install solar racking components and torque beams includes a trailer base with structural supports, having a trailer base with structural supports, having a first pair of left and right cantilever axles affixed to opposite sides of the structural support and a track affixed to each of the left and right cantilever axles, each of the left and right cantilever axles pivotably configured to level the trailer base on a horizontal axis via independent movement of the left and right cantilever axles and to raise, lower, and tilt the trailer base on a vertical axis of the trailer base, a first vertical lift system slidably connected to the trailer base, the first vertical lift system having at least two tabletop rails running lengthwise in parallel with the trailer base and connected crosswise by at least two cross braces, the at least two tabletop rails and the at least two cross braces configured to raise and lower on a vertical axis the torque beams relative to the trailer base to raise the torque beams above the post; and a second vertical lift system slidably connected to a rear of the trailer base, the second vertical lift system having at least two lift assist rails running lengthwise in parallel with the trailer base and connected crosswise by a cross brace, the at least two lift assist rails and the cross brace configured to raise and lower on a vertical axis relative to the trailer base to extract the torque beam from the torque beams positioned on the first vertical lift system to align the torque beam the post.

A feature of the present disclosure may include a transport and positioning system capable of functioning in conditions that otherwise would not be possible for traditional machines (fork trucks/skid loader) used within the industry.

Another feature of the present disclosure may include a transport and positioning system capable of carrying plurality or large quantity of solar racking components and torque beams.

Another feature of the present disclosure may include a transport and positioning system capable of separating one torque beam from a plurality of torque beams and transport such torque beam to a positioning rack.

Another feature of the present disclosure may include a transport and positioning system increases productivity with less manpower as well as equipment.

A method of performing a field install of solar racking components and torque beams to posts in a field, including providing a trailer base with structural supports, having a first pair of left and right cantilever axles affixed to opposite sides of the structural support and a wheel affixed to each of the left and right cantilever axles, each of the left and right cantilever axles pivotably configured to level the trailer base on a horizontal axis via independent movement of the left and right cantilever axles and to raise, lower, and tilt the trailer base on a vertical axis of the trailer base, a first vertical lift system slidably connected to the trailer base, the first vertical lift system having at least two tabletop rails running lengthwise in parallel with the trailer base and connected crosswise by at least two cross braces, the at least two tabletop rails and the at least two cross braces configured to raise and lower on a vertical axis the torque beams relative to the trailer base to raise the torque beams above the post, and a second vertical lift system slidably connected to a rear of the trailer base, the second vertical lift system having at least two lift assist rails running lengthwise in parallel with the trailer base and connected crosswise by a cross brace, the at least two lift assist rails and the cross brace configured to raise and lower on a vertical axis relative to the trailer base to extract the torque beam from the torque beams positioned on the first vertical lift system to align the torque beam the post, loading one or more torque beams on the at least two tabletop rails, adjusting the first pair of left and right cantilever axles, raising the at least two tabletop rails to move the torque beams above the posts, transporting the trailer base system to a position between a first set of the posts, selecting one of the torque beams from the torque beams positioned on the at least two tabletop rails via movement of the second vertical lift system, lowering the second vertical lift system to position one of the torque beams proximate the first set of the posts, and attaching one of the torque beams to the first set of the posts.

In an exemplary embodiment of a system to field install solar racking components and torque beams includes a trailer base with structural supports, a first vertical lift system slidably connected to the trailer base, the first vertical lift system having at least two tabletop rails running lengthwise in parallel with the trailer base and connected crosswise by at least two cross braces, the at least two tabletop rails and the at least two cross braces configured to raise and lower on a vertical axis the torque beams relative to the trailer base to raise the torque beams above the post, and a second vertical lift system slidably connected to a rear of the trailer base, the second vertical lift system having at least two lift assist rails running lengthwise in parallel with the trailer base and connected crosswise by a cross brace, the at least two lift assist rails and the cross brace configured to raise and lower on a vertical axis relative to the trailer base to extract the torque beam from the torque beams positioned on the first vertical lift system to align the torque beam the post.

Another feature of the present disclosure is its ability to provide a trailer with a bed, platform, or base having independent hydraulic cantilever axle and wheel pivotably connected to trailer (base)—to level base on a horizontal or crosswise axis via independent movement of left and right side and raise and lower on a vertical axis trailer (base).

Another feature of the present disclosure is its ability to place trailer (base) on ground (via raising independent cantilever axle and wheel until trailer base is positioned or laying on the ground) to pull and position base as a sled with wheels in an up position, and thus eliminating wheel ruts in muddy conditions.

Another feature of the present disclosure is its ability to provide a lift assist system connected to the base and pivotably connected to a cross brace and a tabletop rail structure—to raise and lower cross brace and tabletop rail on a vertical axis relative to trailer (base) to enable horizontal angle placement of individual or a plurality of torque beams for installation to post set in the field or to raise the set above beam post set in the field.

Another feature of the present disclosure is its ability to provide a lift assist system connected to the base and pivotably connected to a cross brace and a tabletop rail structure- to enable independent movement of front to back and right to left sections of cross brace and tabletop rail to position torque beams in alignment or rotational alignment of horizontal plane relative to beam post for installation to post set in the field.

Another feature of the present disclosure is its ability to provide a self-propelled track or wheel driven machine with a bed, platform, or base having lift assist system connected to the base and pivotably connected to a cross brace and a tabletop rail structure.

Another feature of the present disclosure is its ability to provide a lift assist system connected to the base structure capable of changing out or attaching a variety of assorted attachments, such as a spool real attachment to transport to a work site and function to enable reel dispensing of cable and wiring or the like.

Another feature of the present disclosure is its ability to enable efficient one pass placement and connection of racking components (housed in base) and connection or mounting of torque beams to beam posts in the field.

These and other features of a system to field install solar racking components and torque beams and methods of use will become more apparent to one skilled in the art from the prior Summary and following Brief Description of the Drawings, Detailed Description of exemplary embodiments thereof, and Claims when read in light of the accompanying Drawings or Figures.

BRIEF DESCRIPTION OF THE DRAWINGS

The present system to field install solar racking components and torque beams and methods of use will be better understood by reading the Detailed Description of the Preferred and Selected Alternate Embodiments with reference to the accompanying drawing Figures, in which like reference numerals denote similar structure and refer to like elements throughout, and in which:

FIG. 6.1 is a side perspective view of an exemplary embodiment of a system to field install solar racking components and torque beams, showing trailer base with pivotable and retractable wheel axel assembly with wheels down, according to select embodiments of the instant disclosure;

FIG. 6.2 is a side perspective view of an exemplary embodiment of a system to field install solar racking components and torque beams, showing trailer base with pivotable and retractable wheel axel assembly with wheels up, according to select embodiments of the instant disclosure;

FIG. 6.3 is an exploded side perspective view of an exemplary embodiment of a system to field install solar racking components and torque beams, showing trailer base with pivotable and retractable wheel axel assembly with wheels down, according to select embodiments of the instant disclosure;

FIG. 9 is a flow diagram of an exemplary embodiment of a method of use of an exemplary embodiment of the system to field install solar racking components and torque beams installing torque beams in a field of posts.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

In describing the exemplary embodiments of the present disclosure, as illustrated in the figures specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples. It is recognized herein that the optimum dimensional relationships, to include variations in size, materials, shape, form, position, connection, function and manner of operation, assembly, and use, are intended to be encompassed by the present disclosure.

Figure 1:
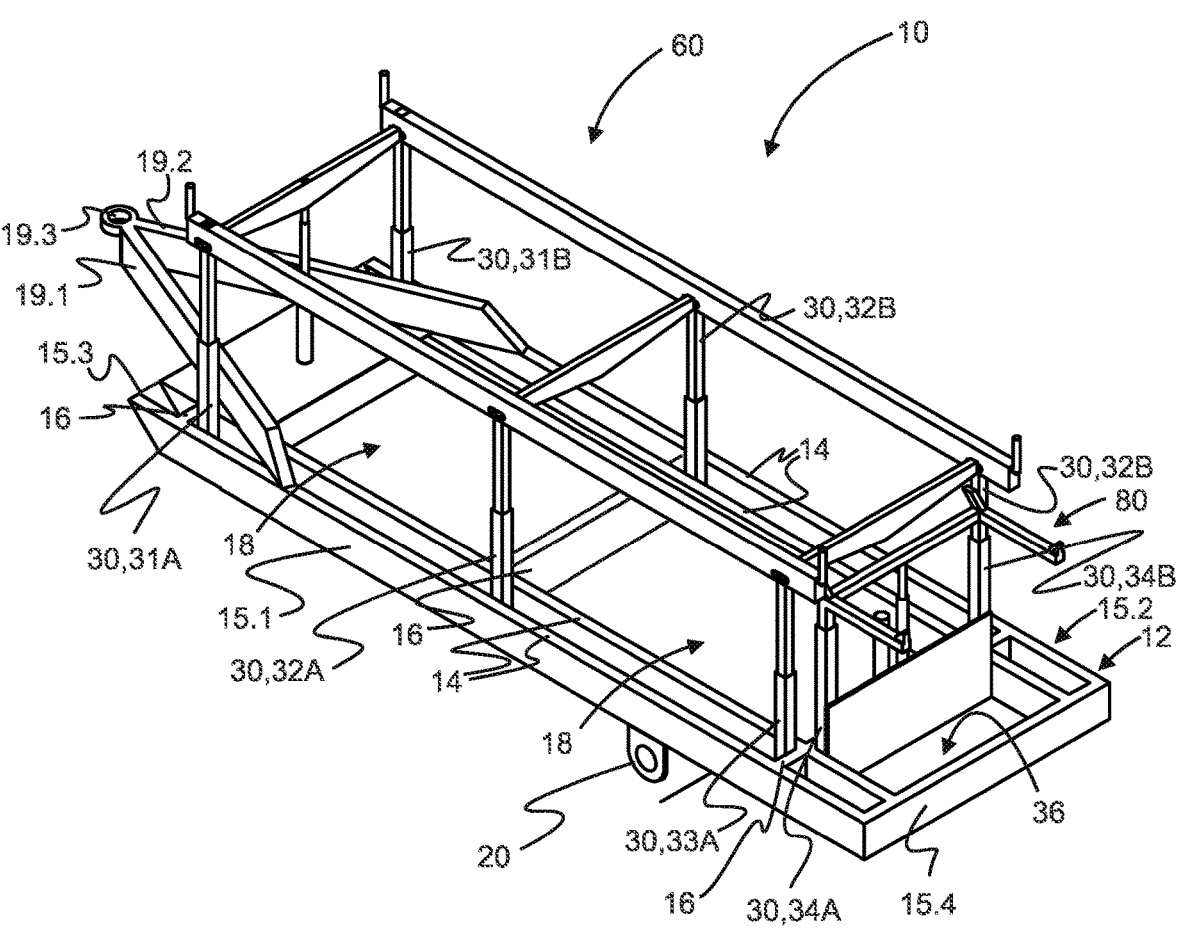
FIG. 1 is a top perspective view of an exemplary embodiment of a system to field install solar racking components and torque beams according to select embodiments of the instant disclosure.
Figure 2:
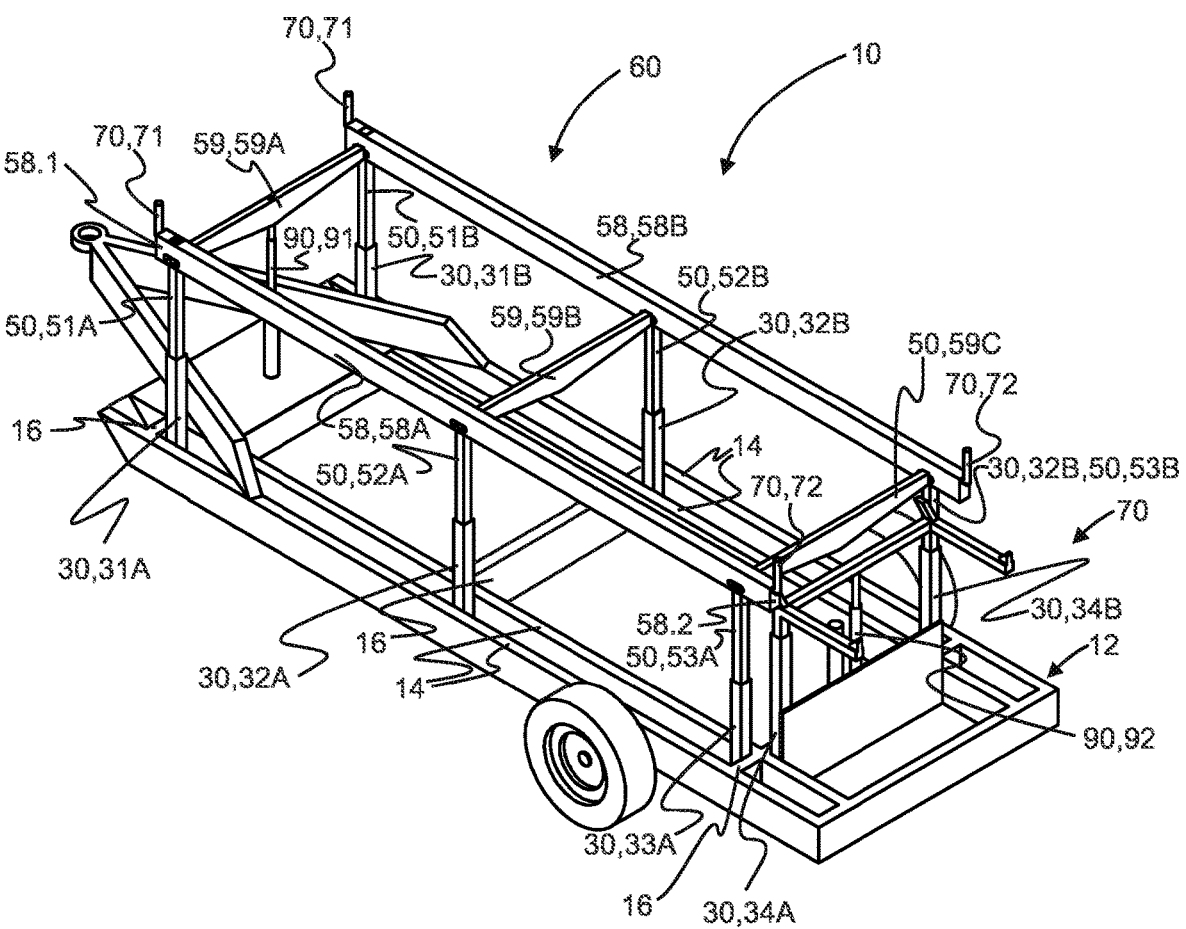
FIG. 2 is a side view of an exemplary embodiment of a system to field install solar racking components and torque beams, showing a trailer base and tongue frame according to select embodiments of the instant disclosure.
Figure 3:
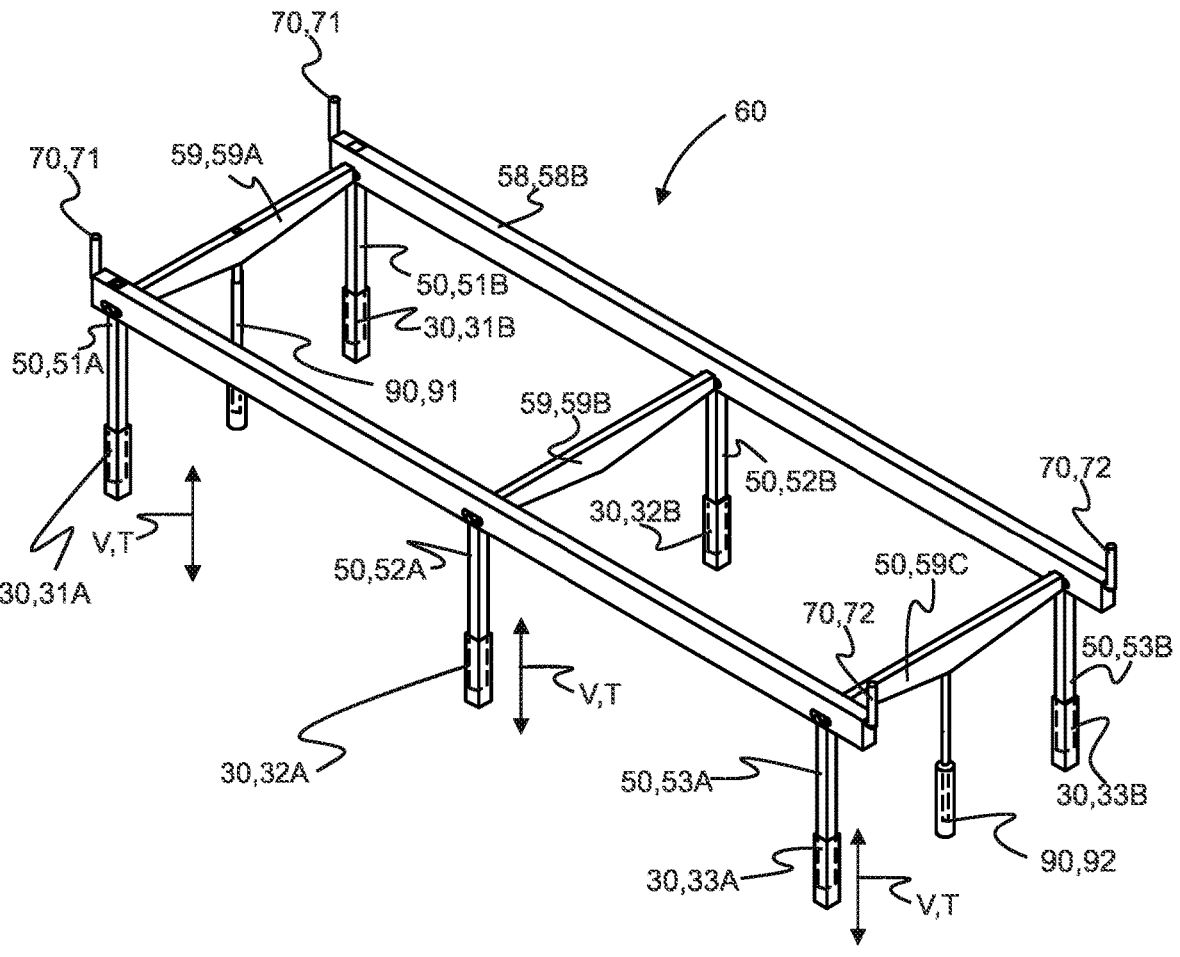
FIG. 3 is a top perspective view of an exemplary embodiment of a system to field install solar racking components and torque beams, showing outer guide supports and inner guide supports of vertical lift tabletop rail system, according to select embodiments of the instant disclosure in FIG. 1.
Figure 4:
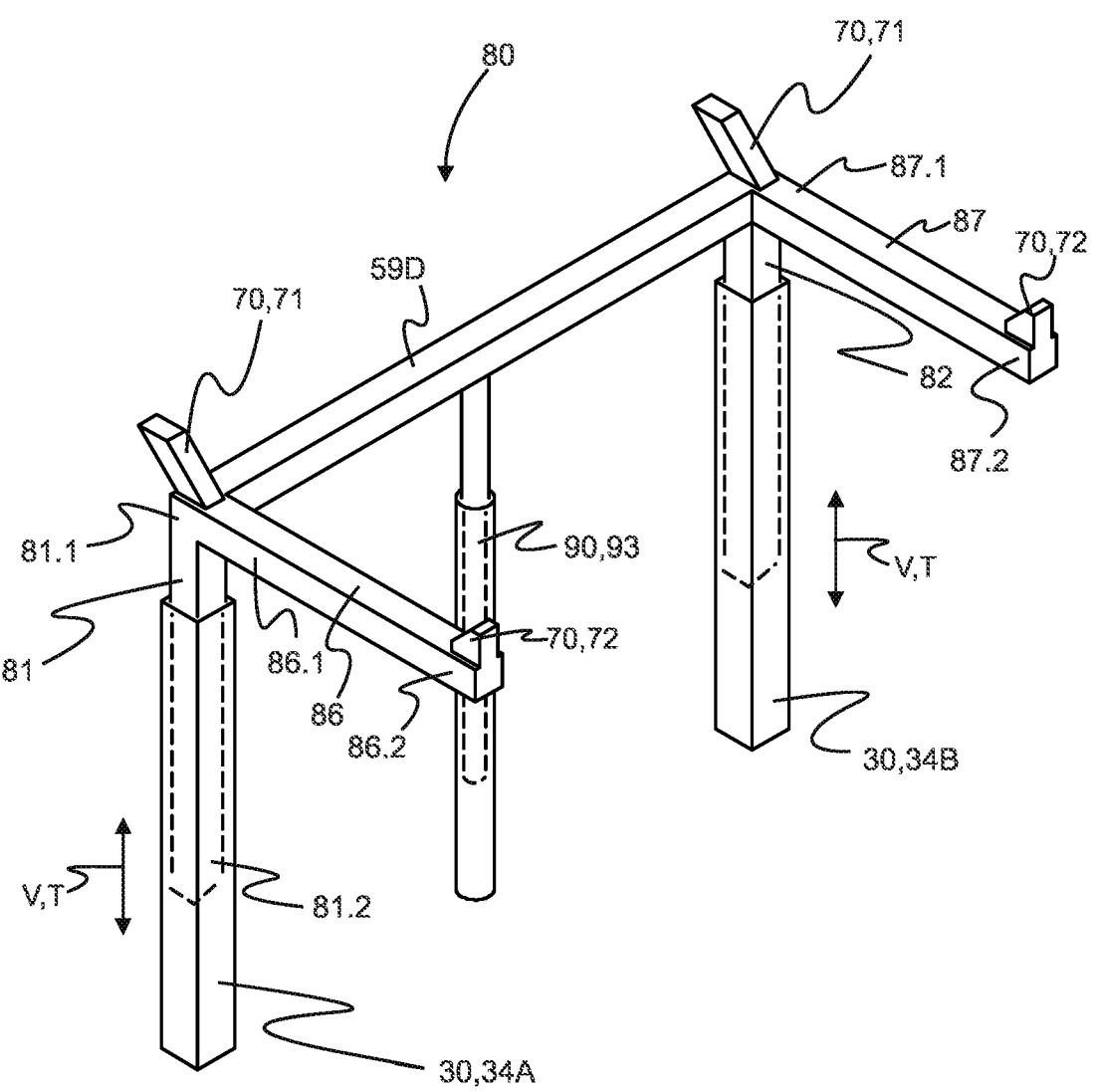
FIG. 4 is a top perspective view of an exemplary embodiment of a system to field install solar racking components and torque beams, showing outer guide supports and inner guide supports of vertical lift assist and picker system, according to select embodiments of the instant disclosure in FIG. 1.
Figure 5:
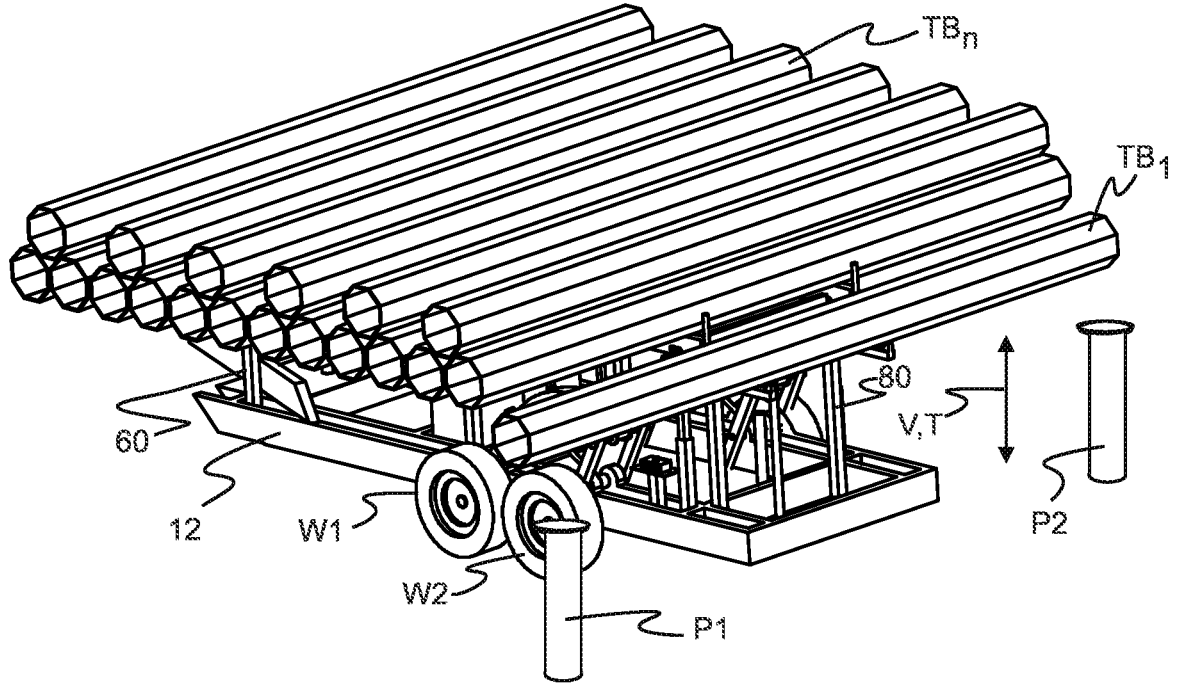
FIG. 5 is a top perspective view of an exemplary embodiment of a system to field install solar racking components and torque beams, showing tabletop rail system and lift assist carrying torque beams, according to select embodiments of the instant disclosure in FIG. 1.1.

Referring now to the FIGS. 1 and 2 there is illustrated an exemplary embodiment of the system to field install solar racking components and torque beams, showing trailer 10 preferably configured as a multi-piece fabricated and assembled height adjustable trailer having a structural frame or platform, such as trailer base 12. Preferably trailer base 12 may be formed of a plurality of rectangular steel structural tubes or elongated structural supports, such as base tubes 14, and preferably four (4) steel tubes positioned in parallel, such as twelve-inch (12") inch steel tubing formed from I-beams with welded plates for example or square tubing, used for its strength and rigidity and configured as a platform base, preferably configured as a rectangle or framed structure or other like configurations. Trailer base 12 may include a perimeter edge or surface, such as one or more frame side 15, such as a pair of sides may include first base side 15.1 and second base side 15.2, front end, such as front base side 15.3, and back end, such as back base side 15.4. Moreover, front end, such front base side 15.3 may be angled front (angled front end) to back by approximately a foot (1') to enable trailer base 12 to be pulled in a skid fashion across the ground and enable front frame side 15.3 to traverse different height changes in terrain T.

In a preferred embodiment trailer base 12 may be eight (8) feet wide and twenty-four (24) feet in length; however, it is contemplated herein that trailer base 12 may be formed or manufactured in any size, shape, dimension, or configuration.

In a preferred embodiment, base tubes 14 may be 12"× 4"×½"; however, it is contemplated herein that base tubes 14 may be formed or manufactured in any size, shape, dimension, or configuration.

Trailer base 12 may include a plurality of rectangular steel structural tubes or elongated structural supports, such as spacer tubes 16 positioned perpendicular to or angled from base tubes 14 and affixed to base tubes 14 and used for its strength and rigidity and configured as a platform base, preferably configured as a rectangle, or framed structure or other like configurations.

In a preferred embodiment spacer tubes 16 may be 12"×4"×½"; however, it is contemplated herein that spacer tubes 16 may be formed or manufactured in any size, shape, dimension, or configuration.

Trailer base 12 may further include a bottom skin, such as bottom plate 18, affixed thereto and covering a bottom side of trailer base 12 or alternatively covering (cover) a portion or portions of trailer base 12 leaving an access area through bottom plate 18, such as one or more or a plurality of removeable panels of bottom plate 18 creating opening 13. Preferably bottom plate 18 may be formed of one-eighth (⅛") inch steel or aluminum diamond plate deck used for its used strength and rigidity, however other material reinforced composite fibers, wood or any rigid load bearing material or size may be utilized herein.

Trailer base 12 may further include compartments positioned at the rear of the trailer, such as connector hardware compartment 36 to be utilized to store and provide easy access to mounting bracket(s) and hardware for installation and mounting of torque beams TB to filed posts P.

Trailer base 12 may still further include a draw bar, such as base tongue 19 preferably affixed to front end 14.3 and top surface of trailer base 12 and configured as angled or V-shaped first base tongue 19.1 and second base tongue 19.2 affixed at an end or first base tongue end. Base tongue 19 may still further include hitch 19.3, such as a Pindell hitch to connect a vehicle V thereto trailer 10.

In a preferred embodiment base tongue 19 may be 12"× 4"×½"; however, it is contemplated herein that base tongue 19 may be formed or manufactured in any size, shape, dimension, or configuration.

It is contemplated herein that other vehicle hitches may be utilized herein, such as but not limited to ball hitch, fifth wheel hitch, draw bar and the like.

It is further contemplated herein that a structural platform of trailer 10, such as base 12, base tubes 14, spacer tubes 16, base tongue 19 and other parts or elements herein may preferably be constructed of steel, iron, aluminum, reinforced composite fibers or any rigid load bearing material as these materials offer a variety of load bearing strengths and weights. It is contemplated herein that other suitable materials may be utilized or the like, whether formed of different materials, or the like, may be utilized, provided such material has sufficient strength, rigidity, load bearing properties durability, chemical resistance, offers long service life, pH tolerance, light weight, and/or durable as would meet the purpose described herein.

It is further contemplated herein that a structural platform of trailer 10, such as base 12, base tubes 14, spacer tubes 16, base tongue 19 and other parts or elements herein may preferably be formed or manufactured in any size, shape, dimension, or configuration and utilized to accommodate a variety of towing capacities, transport of a variety of loads.

Referring now to the FIGS. 1 and 2 there is illustrated an exemplary embodiment of the system to field install solar racking components and torque beams, showing outer guide and axel supports. In this embodiment trailer base 12 may include a plurality of or sets of outer guide supports 30 positioned angled or perpendicular to base tubes 14 and/or spacer tubes 16. Moreover, outer guide supports 30 may include first end outer guide support 30.1 and second end outer guide support 30.2, where for example, first end outer guide support 30.1 may be affixed to base tubes 14 and/or spacer tubes 16 to provide a support conduit for an inner sliding tube. Preferably, outer guide supports 30 may include sets, such as front outer guide support 31A, center outer guide support 32A, back outer guide support 33A spaced apart in a row to form one side of outer guide supports 30. It is contemplated herein that a plurality of or sets of outer guide supports 30 may include parallel second set front outer guide support 31B, center outer guide support 32B, and back outer guide support 33B spaced apart in a row to form second side of outer guide supports 30.

In a preferred embodiment outer guide supports 30 may be 4"×4"×¼"x~41"; however, it is contemplated herein that outer guide supports 30 may be formed or manufactured in any size, shape, dimension, or configuration.

Moreover, in this embodiment trailer base 12 may include a plurality of or sets of axel supports 20 affixed to base tubes 14 or first base side 15.1 and second base side 15.2 and positioned angled or perpendicular or vertically to base tubes 14. Moreover, axel supports 20 may include first axel supports 21 and second axel supports 22 and axel supports 20 may be positioned in an up or down direction and spaced apart to allow specified rims and wheels W to be mounted and positioned linearly along base tubes 14 or first base side 15.1 and second base side 15.2 to adjust trailer load between of axel supports 20, wheels W and outer guide supports 30.

In a preferred embodiment axel supports 20 may be ¾"; however, it is contemplated herein axel supports 20 may be formed or manufactured in any size, shape, dimension, or configuration.

Furthermore, in this embodiment trailer base 12 may include control stand support 24 positioned angled or perpendicular or vertically to base tubes 14. Control stand support 24 may be utilized to support control console 25 utilized to operate components and systems of system to field install solar racking components and torque beams, showing trailer 10.

In a preferred embodiment control stand support 24 may be 4"×4"×¼"; however, it is contemplated herein that outer guide supports 30 may be formed or manufactured in any size, shape, dimension, or configuration.

Referring now to the FIGS. 1, 2, 3 and 5 there is illustrated an exemplary embodiment of the system to field install solar racking components and torque beams 10, showing vertical movement V, and tilt system, and rail support for supporting and vertical movement of torque beam TB. In this embodiment trailer base 12 may include first vertical lift and tilt system, and rail support, such as top rail support 60 configured to slide up and down therein outer guide supports 30. Moreover, top rail support 60 may include a plurality of, at least two of, sets of, or pair of support tabletop rails 58 positioned parallel and above base tubes 14. Support tabletop rails 58 may include first end support tabletop rails 58.1 and second end support tabletop rails 58.2. Top rail support 60, may include left or first tabletop rail 58A and right or second tabletop rail 58B positioned parallel to one another. Furthermore, first tabletop rail 58A and second tabletop rail 58B may be linked or fixed one to the other to form a box or rectangle or table by a cross brace, such as by ram connecting brace 59, such as front or first ram connecting brace 59A, back or second ram connecting brace 59C, and centered ram connecting brace 59B positioned parallel to one another and affixed to an inside of first tabletop rail 58A and second tabletop rail 58B to form top rail support 60.

In a preferred embodiment tabletop rails 58 may be 16"×2"×20'; however, it is contemplated herein that tabletop rails 58 may be formed or manufactured in any size, shape, dimension, or configuration.

In a preferred embodiment ram connecting brace 59, may be 3"×3"×64"; however, it is contemplated herein that ram connecting brace 59, may be formed or manufactured in any size, shape, dimension, or configuration.

Still furthermore, top rail support 60 may include a plurality of, at least two of, sets of, or pairs of inner guide supports 50 positioned angled or perpendicular to tabletop rails 58 and/or ram connecting brace 59. Inner guide supports 50 may include first end inner guide support 50.1 and second end inner guide support 50.2, where for example, first end inner guide support 50.1 may be rotationally or pivotably affixed to tabletop rails 58 and/or ram connecting brace 59 to provide an adjustable non-binding support conduit for sliding therein outer guide supports 30. Preferably, inner guide supports 50 may include sets, such as first front inner guide support 51A, center inner guide support 52A, back inner guide support 53A spaced apart in a row to form one side of inner guide supports 50. It is contemplated herein that a plurality of or sets of inner guide supports 50 may include parallel second set front inner guide support 51B, center inner guide support 52B, and back outer guide support 53B spaced apart in a row to form second side of inner guide supports 50.

In a preferred embodiment inner guide supports 50 may be 3"×3"×¼"x~42"; however, it is contemplated herein that inner guide supports 50 may be formed or manufactured in any size, shape, dimension, or configuration provided that fit within and slide vertically therein outer guide supports 30.

It is contemplated herein that second end inner guide support 50.2 of inner guide supports 50 slides (slidable) therein second end outer guide support 30.2 to enable height adjustment of top rail support 60 relative to trailer base 12 via one or more lift mechanisms, such as table hydraulic actuator 90 positioned between trailer base 12 and top rail support 60, and more specifically between trailer base 12 and ram connecting brace 59, or a pair of table hydraulic actuator 90, such as first table hydraulic actuator 91 between trailer base 12 and first ram connecting brace 59A and second table hydraulic actuator 92 between trailer base 12 and second ram connecting brace 59C.

Still furthermore, top rail support 60 may include a plurality of, sets of, or pair of stops, cleats, or pins 70, such as pair of first or back stops 71 and pair of second or front stops 72, where back stops 71 may be positioned and removably affixed to tabletop rails 58 and/or ram connecting brace 59 proximate first end support tabletop rails 58.1 and front stops 72 may be positioned and removably affixed to tabletop rails 58 and/or ram connecting brace 59 proximate second end support tabletop rails 58.2 to hold or keep torque beams TB from sliding off top rail support 60.

In use, top rail support 60 may be utilized to store, carry, and vertically move torque beams TB, to be able to raise and lower top rail support 60 with a load of torque beams TB, on a vertical axis relative to trailer to a height above field post installations or other content to enable movement of trailer around installation site, and to adjust top rail support 60 to a height to assist with positioning torque beams TB at the correct height and angle to match post height for installation of torque beams TB on spaced apart field posts.

Referring now to the FIGS. 1, 2, 4 and 5 there is illustrated an exemplary embodiment of the system to field install solar racking components and torque beams 10, showing torque beams TB vertical lift and tilt assist, and picker system for supporting, vertical movement V, tilt, and selecting of torque beam TB from a group of torque beams TB supported by top rail support 60. In this embodiment trailer base 12 may include a second vertical lift system and tilt, and picker system, such as lift assist 80 configured to slide up and down therein outer guide supports 30, 34A, 34B.

Moreover, lift assist 80 may include a plurality of, at least two, set of, or pair of lift assist rails 86, 87 positioned parallel and above base tubes 14. Lift assist rails 86, 87 may include first end lift assist rails 86.1, 87.1 and second end lift assist rails 86.2, 87.2. Lift assist 80, may include left or first lift assist rail 86 and right or second lift assist rail 87 positioned parallel to one another. Furthermore, left or first lift assist rail 86 and right or second lift assist rail 87 may be linked or fixed crosswise one to the other by a cross brace to form a u-shaped configuration, such as by lift assist ram connecting brace 59D, and affixed to an inside of first lift assist rail 86 and right or second lift assist rail 87 proximate first end lift assist rails 86.1, 87.1 to form lift assist 80.

In a preferred embodiment left or first lift assist rail 86 and right or second lift assist rail 87, and lift assist ram connecting brace 59D, may be 2"×2"; however, it is contemplated herein that first lift assist rail 86 and right or second lift assist rail 87, and lift assist ram connecting brace 59D, may be formed or manufactured in any size, shape, dimension, or configuration.

Furthermore, lift assist 80 may include a plurality of, set of, or pair of inner guide supports 81, 82 positioned angled or perpendicular to and affixed to left first lift assist rail 86 and right or second lift assist rail 87 and/or lift assist ram connecting brace 59D. Inner guide supports 81, 82 may include first end inner guide support 81.1 and second end inner guide support 81.2, where for example, first end inner guide support 81.1 may be affixed to left or first lift assist rail 86 and right or second lift assist rail 87 and/or ram connecting brace 59 to provide an adjustable support conduit for sliding therein outer guide supports 30, 34A, 34B. Preferably, inner guide supports 81, 82 may include set, such as left or first inner guide support 81 and second or right inner guide support 82 spaced apart in a row to form inner guide supports 81, 82 to provide an adjustable non-binding support conduit for sliding (slidable) therein outer guide supports 30.

In a preferred embodiment inner guide supports 81, 82 may be 3"×3"×¼"x~42"; however, it is contemplated herein that inner guide supports 81, 82 may be formed or manufactured in any size, shape, dimension, or configuration provided that fit within and slide vertically therein outer guide supports 30.

Still furthermore, lift assist 80 may include a plurality of, sets of, or pairs of stops, cleats, or pins 70, such as pair of first or back stops 71 and pair of second or front stops 72, where back stops 71 may be positioned and removably affixed to first lift assist rail 86 and right or second lift assist rail 87 and/or lift assist ram connecting brace 59D preferably proximate first end lift assist rails 86.1, 87.1 and front stops 72 may be positioned and removably affixed to first lift assist rail 86 and right or second lift assist rail 87 preferably proximate second end lift assist rails 86.2, 87.2 to hold or keep torque beams TB from sliding off lift assist 80 and back stops 71 extract a torque beam TB1 from the bundle of torque beams TBn tabletop rails 58 held in position back stops 72 of tabletop rails 58.

In use, lift assist 80 and first or back stops 71 may be utilized to pick or extract or under catch and carry one or more torque beams TB from top rail support 60, to be able to raise and lower lift assist 80 with one or more torque beams TB on a vertical axis relative to trailer to a height to assist with positioning torque beams TB at the correct height and angle to match post P1 and P2 height for installation of torque beams TB on spaced apart field posts P.

It is further contemplated that lift assist 80 may have one or two hydraulic actuators 90, 93 to enable raising and lowering of each side angling of first lift assist rail 86 and right or second lift assist rail 87 to achieve the proper height and angle of torque beams TB to mount to filed posts P.

Trailer base 12 may further include a power system, such as motor M to drive pump P via controls C to provide for hydraulic power to hydraulic tube (tubing) connected to hydraulic actuators 90 to provide directional force and movement and provide the raise and lower functions for top rail support 60 and lift assist 80. Other power system are contemplated herein.

Referring now to the FIGS. 6.1 and 6.2 there is illustrated an exemplary embodiment of pivotable and retractable independent left and right cantilever axles, first left and right cantilever axles, second left and right cantilever axles and wheel assemblies, such as pivotable wheel axel assembly 100 connected to trailer base 12. Pivotable wheel axel(s) assembly 100 may include a pair of, left and right swing arms or set of swing arms or pivot arms for each side of axel and wheel W, such as axel swing arm assembly 110. Axel swing arm assembly 110 may include top or first axel arm end 110.1, bottom or second axel arm end 110.2, and middle or third axel arm position 110.3. For each assembly, third axel arm position 110.3 may be rotationally affixed to axel mount 20 of trailer base 12 to secure axel swing arm 110 thereto trailer base 12. First axel arm end 110.1 may be utilized to secure wheel W thereto axel swing arm 110. Hydraulic actuator 90, 94, 95 may be rotationally secured to trailer base 12 and rotationally affixed second axel arm end 110.2 and utilized to provide directional force and movement and provide the raise and lower functions for axel swing arm 110 to move axel and wheel W, W1, W3 between fully lowered and raised wheel W positions and anywhere in between.

It is contemplated herein that stub axle 120 may be affixed and positioned perpendicular to axel swing arm assembly 110 and preferably oriented in a direction away from or outside trailer base 12 and first axel arm end 110.1.

Moreover, pivotable wheel axel(s) assembly 100 may include a pair of or set of swing arms or pivot arms, such as first axel swing arm 110A1 and second axel swing arm 110A2 positioned on each side of base tubes 14 of trailer base 12 and rotationally connected to axel mount 20 to secure and support pivotable wheel axel(s) assembly 100. First axel swing arm 110A1 and second axel swing arm 110A2 may support a tandem or dually pair of wheels W. Moreover, as disclosed other first axel swing arm 110A1, B1, C1, D1 and second axel swing arm 110A2, B2, C2, D2.

Furthermore, each side of trailer base 12 may include second axel and wheel(s) W, W2, W4 supported by second pivotable wheel axel(s) assembly 100C, D. Pivotable wheel axel(s) assembly 110A1, A2/110C1, C2 and second pivotable wheel axel(s) assembly 110B1, B2/110D1, D2, respectively, may be linked by arced tandem arm, such as wheel assembly pivot arm 130AC, 130BD, respectively. For example, connected between first pivotable wheel axel(s) assembly 110A1, A2 and second pivotable wheel axel(s) assembly 110C1, C2 of each of first pivotable wheel axel(s) assembly 100A and second pivotable wheel axel(s) assembly 100C resulting in tandem or unison raise and lower functions for axel swing arms 110A,C to move axels and wheels W, W1,W2 between fully lowered wheel W position shown in FIG. 6.2 and fully raised wheel W position shown in FIG. 6.1 and anywhere in between.

It is contemplated herein that pivotable wheel axel(s) assembly 100 may include pins, locking mechanism, nut and bolts, or other locking mechanism known to one of ordinary skill in the art.

It is further contemplated herein that pivotable wheel axel(s) assembly 100 may be utilized to level or tilt trailer base 12 on a horizontal axis via independent movement of left and right sides of pivotable wheel axel(s) assembly 100 to raise and lower or tilt and raise and lower on a vertical axis trailer base 12 and torque beams TB to mount thereto field posts P1 and P2.

It is further contemplated herein that pivotable wheel axel(s) assembly 100 may be utilized to raise axel and wheels W to full up position, thus lowering trailer base 12 to ground to place trailer base 12 on the ground. When a tractor or other tracked vehicle pulls trailer base 12 no wheel ruts will be left in the installation field and trailer base 12 will slide or skid across the installation field.

It is further contemplated herein that trailer base 12 may include any style or configuration or axel count, whether commercially available or developed in the future.

Figure 7:
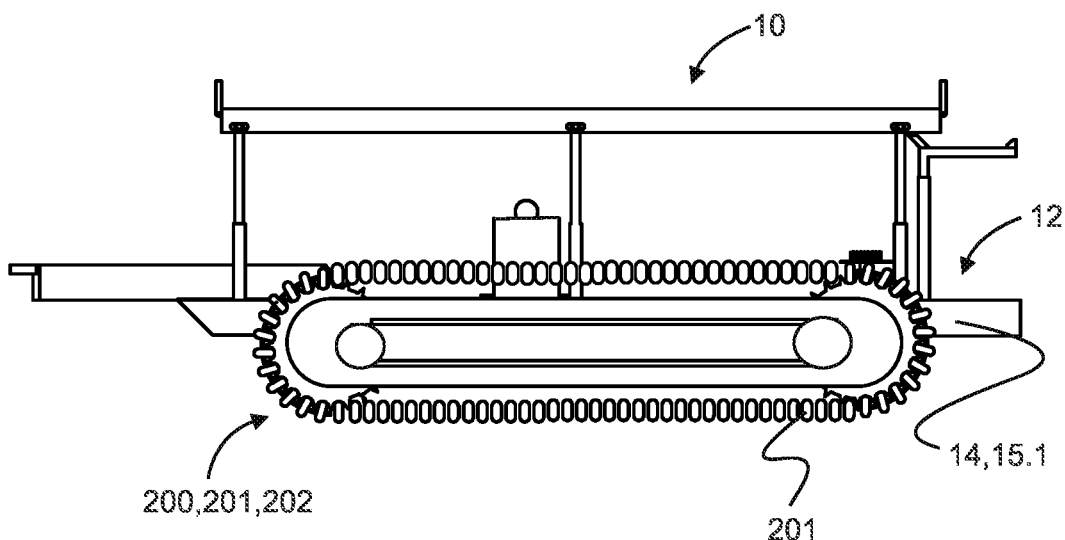
FIG. 7 is a side perspective view of an exemplary embodiment of a system to field install solar racking components and torque beams, showing an alternative drive system, according to select embodiments of the instant disclosure.

Referring now to the FIG. 7 there is illustrated an exemplary embodiment of system to field install solar racking components and torque beams 10, showing an alternative drive system 200 wherein two or more tracks may be utilized as a drive system to propel and position system to field install solar racking components and torque beams 10. Two or more tracks 200, such as first track 201 affixed to base tubes 14 of base side 15.1 of trailer base 12 and opposite second track 202 affixed to base tubes 14 of base side 15.2 of trailer base 12. Moreover, tracks 200 may be powered with a separate power system or be powered by current hydraulic system, such as power system, such as motor M to drive pump P via controls C to provide for hydraulic power to hydraulic tubing connected to tracks 200.

It is contemplated herein that tracks 200 may be mounted to cantilever axle or a stationary axel may be utilized herein.

It is further contemplated herein that skid steer track drive system may be wire controlled or wireless with a remote control handheld to propel and position system to field install solar racking components and torque beams 10 remotely, such as an operator working the field installation. Likewise, rack selection, raise and lower or positioning of rack may be controlled by similar functionality integrated into the same controller.

It is further contemplated that other means of traction such as wheels or other mobility means to propel and position system to field install solar racking components and torque beams 10 may be utilized herein.

Figure 8:
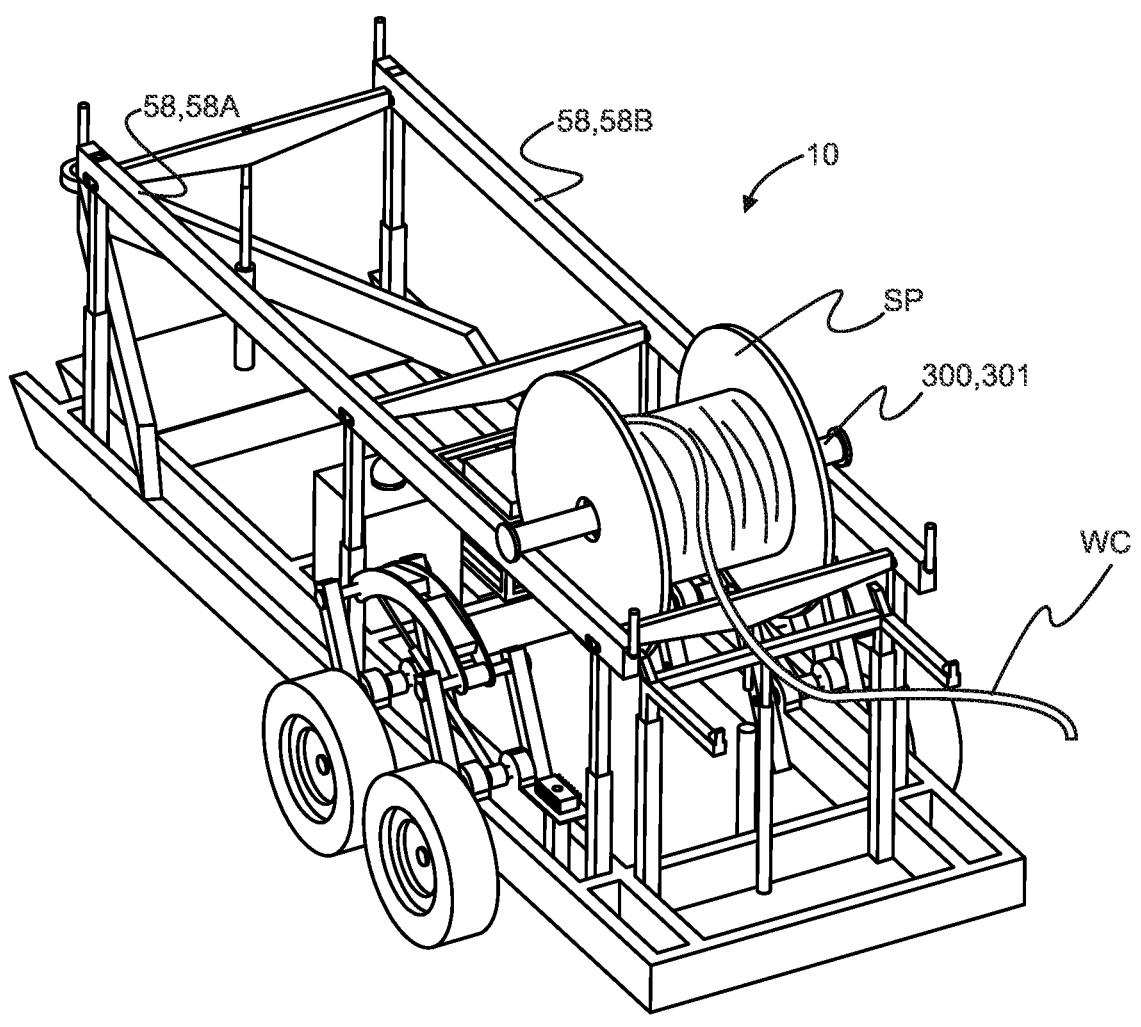
FIG. 8 is a top perspective view of an exemplary embodiment of a system to field install solar racking components and torque beams, showing an alternative rack system to hold a spool of wire or cable, according to select embodiments of the instant disclosure.

Referring now to the FIG. 8 there is illustrated an exemplary embodiment of system to field install solar racking components and torque beams 10, showing an alternative addition to support tabletop rails 58. Support tabletop rails 58 may include removable tabletop or one or more spaced parallel spool bars 300, such as spool bar 301 that may be removably affixed to support tabletop rails 58 to vertical lift or tilt spool bar 301 and spool SP of wire or cable WC to dispense or distributing wire, wiring, or cable WC therefrom field install solar racking components and torque beams 10.

Alternatively, spool bars 300 may be removably affixed to base tubes 14.

With a removable tabletop allows for assorted attachments such as a spoil real attachment (shown) to be implemented on the structure base or vertical lift assist. It is contemplated herein that removable tabletop may be configured to transport a variety of field installation materials.

With respect to the description herein, it is to be realized that the optimum dimensional relationships, to include variations in size, materials, shape, form, configuration, position, connection, function and manner of operation, assembly, and use, are intended to be encompassed by the present disclosure.

It is contemplated herein that system to field install solar racking components and torque beams, showing trailer 10 components may be constructed of steel, stainless steel, 316 stainless steel, marine grade aluminum, aluminum, carbon fiber, suitable plastics, or other like materials and of different dimensions. This and other materials herein may be constructed of high density polyethylene or similar high tensile or strengthened materials, as these material offers a variety of forms and shapes and provide strength with reduced weight; however, other suitable materials or the like, can be utilized, provided such material has sufficient strength and/or durability as would meet the purpose described herein to enable system to field install solar racking components and torque beams, showing trailer 10 to meet construction and specifications. It is understood herein that various changes in the material used, shape, size, arrangement of parts, and parts are connected with welds, bolts, pins, screws, glues, adhesives, clamps, or similar fasteners or other devices without departing from the spirit of the scope of the claims herein.

Referring now to FIG. 9, there is illustrated, a flow diagram 900 of a method of performing a field install solar racking components and torque beams. In block or step 910, providing system to field install solar racking components and torque beams 10 as set forth in any of the embodiments discussed herein, and/or shown in FIGS. 1-7. In block or step 915 loading one or more torque beams TB on top rail support 60, such as left or first tabletop rail 58A and right or second tabletop rail 58B. In block or step 920 raising or lowering pivotable wheel axel assembly 100 to utilize wheels W or retract wheels W to transition to a skid or sled. In block or step 925 raising top rail support 60 so one or more torque beams TB are positioned above field posts P. In block or step 930, transporting system to field install solar racking components and torque beams 10 to a position between first set of field poles P. In block or step 935, picking or selecting one torque beams TB from one or more torque beams TB on top rail support 60 via vertical lift and tilt assist, and picker, such as lift assist 80. In block or step 940 raising or lowering or tilting vertical lift and tilt assist, and picker, such as lift assist 80 to position one torque beams TB proximate first set of field poles P. In block or step 945 raising or lowering pivotable wheel axel assembly 100 to position one torque beams TB proximate first set of field poles P. In block or step 950, attaching one torque beams TB proximate first set of field poles P using attachment hardware stored in rear compartment of system. In block or step 955, transporting system to field install solar racking components and torque beams 10 to a position between second set of field poles P.

It is further understood herein that the parts and elements of this disclosure may be located, or position elsewhere based on one of ordinary skill in the art without deviating from the present disclosure.

With respect to the above description then, it is to be realized that the optimum dimensional relationships, to include variations in size, materials, shape, form, position, movement mechanisms, function and manner of operation, assembly and use, are intended to be encompassed by the present disclosure.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Moreover, the present disclosure has been described in detail, it should be understood that various changes, substitutions and alterations can be made thereto without departing from the spirit and scope of the disclosure as defined by the appended claims. Accordingly, the present disclosure is not limited to the specific embodiments illustrated herein but is limited only by the following claims.

The invention claimed is:

1. A system to field install racking components and torque beams to posts in a field, said system comprising:
   a trailer base with structural supports;
   a first pair of left and right cantilever axles affixed to opposite sides of said structural supports each of said left and right cantilever axles having an independent hydraulic circuit dedicated to control up-and-down movement to adjust a side pitch of said trailer base along a horizontal axis;
   a wheel affixed to each of said left and right cantilever axles, each of said left and right cantilever axles pivotably configured to level said trailer base on a horizontal axis via said independent hydraulic circuits;
   a first vertical lift system slidably connected to said trailer base, said first vertical lift system having at least two tabletop rails running lengthwise in parallel with said trailer base and connected crosswise by at least two cross braces, said at least two tabletop rails and said at least two cross braces configured to raise and lower the torque beams on a vertical axis relative to said trailer base to position the torque beams above the post; and
   a second vertical lift system slidably connected to a rear of said trailer base, said second vertical lift system having at least two lift assist rails running lengthwise in parallel with said trailer base and connected crosswise by a cross brace, said at least two lift assist rails and said cross brace configured to raise and lower on a vertical axis relative to said trailer base to extract the torque beam from the torque beams positioned on said first vertical lift system and to align the torque beam with the posts.

2. The system of claim 1, wherein said trailer base further comprising an angled front end.

3. The system of claim 2, wherein said trailer base further comprising a bottom plate to cover a bottom side of said trailer base.

4. The system of claim 3, wherein said independent left and right cantilever axles are configured to place said trailer base on the field to pull and position as a sled to eliminate wheel ruts in the field.

5. The system of claim 1, wherein said trailer base further comprising a compartment positioned at a rear of said trailer base configured to store a mounting bracket to install the torque beams to the posts.

6. The system of claim 1, wherein said trailer base further comprising a draw bar.

7. The system of claim 1, wherein said trailer base further comprising a plurality of outer guide supports and said first vertical lift system having a plurality of inner guide supports slidable therein said plurality of outer guide supports.

8. The system of claim 1, wherein said at least two tabletop rails further comprising a pair of back stops and a pair of front stops.

9. The system of claim 8, wherein said at least at least two lift assist rails further comprising a pair of back stops and a pair of front stops.

10. The system of claim 9, wherein said pair of back stops of said at least two lift assist rails extract the torque beam from the torque beams on said at least two tabletop rails being held in position by said pair of back stops of said at least two tabletop rails.

11. The system of claim 1, wherein said trailer base further comprising a motor to drive a pump via controls to provide for hydraulic power to a hydraulic tube connected between said pump and a hydraulic actuator to move said first vertical lift system and said second vertical lift system.

12. The system of claim 11, wherein said hydraulic actuator is configured to move said first left and right cantilever axles.

13. The system of claim 1, further comprising a second pair of left and right cantilever axles affixed to opposite sides of said structural support and proximate said first pair of left and right cantilever axles.

14. The system of claim 13, further comprising left and right swing arms to connect said second pair of left and right cantilever axles to said first pair of left and right cantilever axles.

15. The system of claim 11, further comprising a control stand support to support control console, said control console configured to operate said motor, and said hydraulic actuator.

16. The system of claim 1, wherein said at least two tabletop rails further comprising a spool bar removeably affixed to said at least two tabletop rails to support a spool of wire to distribute in the field.

17. A system to field install racking components and torque beams to posts in a field, said system comprising:
   a trailer base with structural supports;
   a first pair of left and right cantilever axles affixed to opposite sides of said structural supports, each of said left and right cantilever axles including an independent hydraulic circuit dedicated to controlling up-and-down movement to adjust the side pitch of said trailer base along a horizontal axis;
   a track affixed to each of said left and right cantilever axles, said cantilever axles pivotably configured to level said trailer base on a horizontal axis via said independent hydraulic circuits;
   a first vertical lift system slidably connected to said trailer base, said first vertical lift system having at least two tabletop rails running lengthwise in parallel with said trailer base and connected crosswise by at least two cross braces, said at least two tabletop rails and said at least two cross braces configured to raise and lower the torque beams on a vertical axis relative to said trailer base to position the torque beams above the post; and
   a second vertical lift system slidably connected to a rear of said trailer base, said second vertical lift system having at least two lift assist rails running lengthwise in parallel with said trailer base and connected crosswise by a cross brace, said at least two lift assist rails and said cross brace configured to raise and lower on a vertical axis relative to said trailer base to extract the torque beam from the torque beams positioned on said first vertical lift system and to align the torque beam with the post.

18. A method of performing a field install of solar racking components and torque beams to posts in a field, said method comprising the steps of:

providing a trailer base with structural supports, having a first pair of left and right cantilever axles affixed to opposite sides of said structural supports, each of said left and right cantilever axles including an independent hydraulic circuit dedicated to controlling up-and-down movement to adjust the side pitch of said trailer base along a horizontal axis, and a wheel affixed to each of said left and right cantilever axles, each of said left and right cantilever axles pivotably configured to level said trailer base on a horizontal axis via said independent hydraulic circuits;

providing a first vertical lift system slidably connected to said trailer base, said first vertical lift system having at least two tabletop rails running lengthwise in parallel with said trailer base and connected crosswise by at least two cross braces, said at least two tabletop rails and said at least two cross braces configured to raise and lower on a vertical axis the torque beams on a vertical axis relative to said trailer base to position the torque beams above the post, providing a second vertical lift system slidably connected to a rear of said trailer base, said second vertical lift system having at least two lift assist rails running lengthwise in parallel with said trailer base and connected crosswise by a cross brace, said at least two lift assist rails and said cross brace configured to raise and lower on a vertical axis relative to said trailer base to extract the torque beam from the torque beams positioned on said first vertical lift system and to align the torque beam with the post;

loading one or more torque beams on said at least two tabletop rails;

adjusting said first pair of left and right cantilever axles using their respective independent hydraulic circuits to level said trailer base by controlling side pitch;

raising said at least two tabletop rails using said first vertical lift system to move the torque beams above the posts;

transporting said trailer base system to a position between a first set of the posts;

selecting one of the torque beams from the torque beams positioned on said at least two tabletop rails via movement of said second vertical lift system;

lowering said second vertical lift system to position one of the torque beams proximate the first set of the posts; and attaching one of the torque beams to the first set of the posts.

19. A system to field install racking components and torque beams to posts in a field, said system comprising:
   a trailer base with structural supports;
   a first vertical lift system slidably connected to said trailer base, said first vertical lift system having at least two tabletop rails running lengthwise in parallel with said trailer base and connected crosswise by at least two cross braces, said at least two tabletop rails and said at least two cross braces configured to raise and lower the torque beams on a vertical axis relative to said trailer base to position the torque beams above the post;
   a cantilever scissor lift mechanism integrated into said first vertical lift system, said cantilever scissor lift mechanism having a pair of scissor arms extending laterally from each of said at least two tabletop rails, said scissor arms pivotably configured to provide a side lift motion in a horizontal plane to adjust the lateral position of the torque beams relative to the posts; and a second vertical lift system slidably connected to a rear of said trailer base, said second vertical lift system having at least two lift assist rails running lengthwise in parallel with said trailer base and connected crosswise by a cross brace, said at least two lift assist rails and said cross brace configured to raise and lower on a vertical axis relative to said trailer base to extract the torque beam from the torque beams positioned on said first vertical lift system and to align the torque beam with the post.

20. The system of claim 1, further comprising a cantilever scissor lift mechanism integrated into said first vertical lift system, said cantilever scissor lift mechanism having a pair of scissor arms extending laterally from each of said at least two tabletop rails, said scissor arms pivotably configured to provide a side lift motion in a horizontal plane to adjust the lateral position of the torque beams relative to the posts.

21. The system of claim 17, further comprising a cantilever scissor lift mechanism integrated into said first vertical lift system, said cantilever scissor lift mechanism having a pair of scissor arms extending laterally from each of said at least two tabletop rails, said scissor arms pivotably configured to provide a side lift motion in a horizontal plane to adjust the lateral position of the torque beams relative to the posts, distinct from vertical lifting.

22. The method of claim 18, further comprising the step of integrating a cantilever scissor lift mechanism into said first vertical lift system, said cantilever scissor lift mechanism comprising a pair of scissor arms extending laterally from each of said at least two tabletop rails, said scissor arms pivotably configured to provide a side lift motion in a horizontal plane to adjust the lateral position of the torque beams relative to the posts.

* * * * *